(12) United States Patent
Wasada

(10) Patent No.: US 6,717,619 B2
(45) Date of Patent: Apr. 6, 2004

(54) PROMPTER SYSTEM

(75) Inventor: Masayoshi Wasada, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/950,720

(22) Filed: Sep. 13, 2001

(65) Prior Publication Data
US 2002/0030758 A1 Mar. 14, 2002

(30) Foreign Application Priority Data

Sep. 14, 2000 (JP) ........................................ 2000-279754

(51) Int. Cl.[7] .............................................. H04N 5/225
(52) U.S. Cl. .................................. 348/375; 348/722
(58) Field of Search ................................ 348/373, 375, 348/722

(56) References Cited

U.S. PATENT DOCUMENTS

| | | | | | |
|---|---|---|---|---|---|
| 4,019,298 A | * | 4/1977 | Johnson, IV | ............... | 52/590.1 |
| 5,386,227 A | * | 1/1995 | Zeper | ......................... | 348/375 |
| 5,721,586 A | * | 2/1998 | Shimamura et al. | ........ | 348/375 |
| 6,124,892 A | * | 9/2000 | Nakano | ...................... | 348/373 |
| 6,364,259 B1 | * | 4/2002 | Boudard | .................. | 248/177.1 |

* cited by examiner

Primary Examiner—Vu Le
Assistant Examiner—Matthew L Rosendale
(74) Attorney, Agent, or Firm—Birch, Stewart, Kolasch & Birch, LLP

(57) ABSTRACT

A television camera is attached to a mount plate which is attached to a panhead, and a prompter body is detachably attached to the mount plate. When detaching the prompter body from the panhead, the prompter body itself is detached from the mount plate without detaching the television camera from the mount plate.

5 Claims, 5 Drawing Sheets

F I G. 1
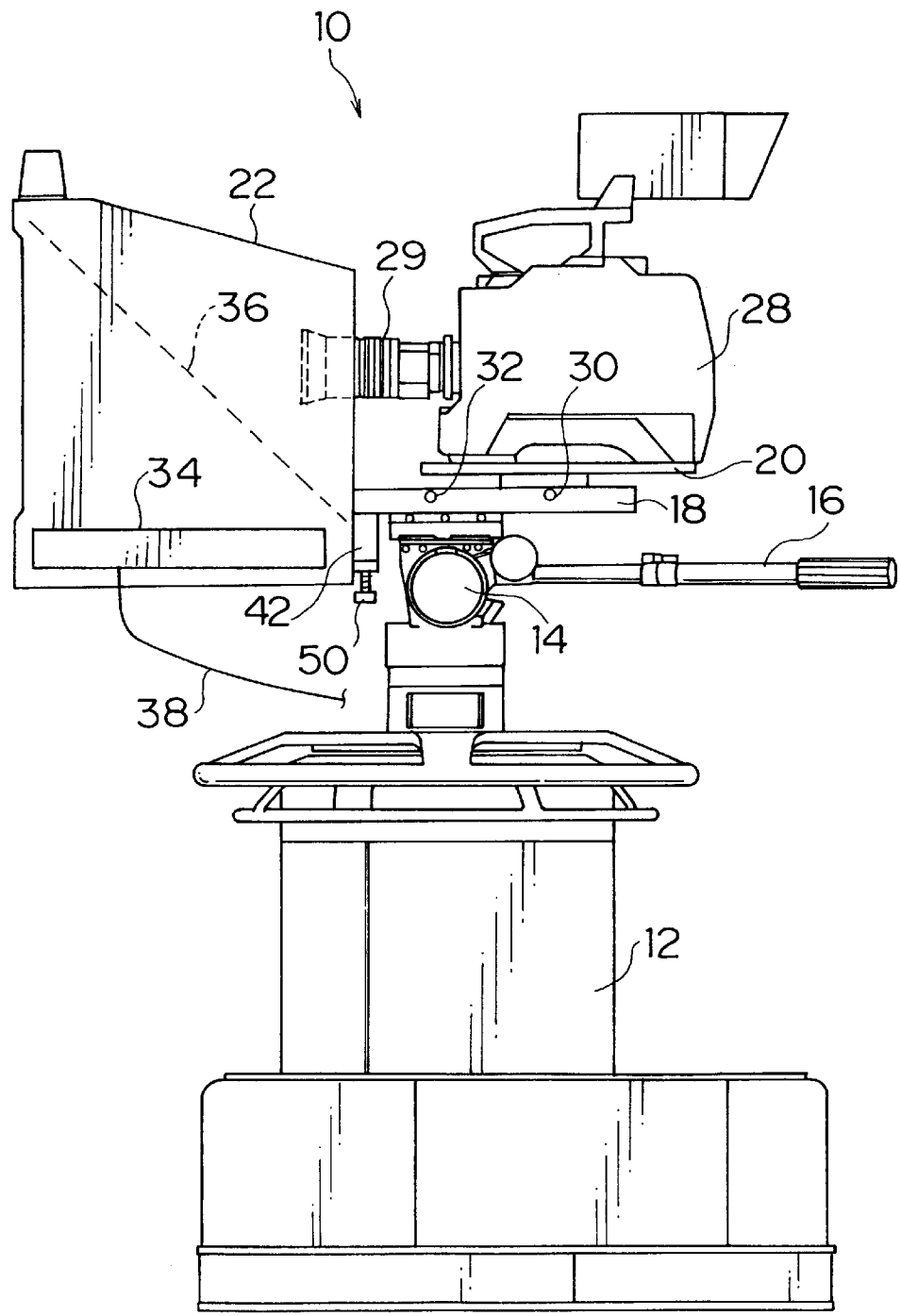

PROMPTER SYSTEM

BACKGROUND OF THE INVENTION

1. Field of the Invention

The present invention relates to a prompter system, which is used at a television broadcasting station.

2. Description of the Related Art

A prompter system is provided to a television camera used at a television broadcasting station so as to display a script image to a newscaster, an MC or performers on whom the television camera is trained.

A conventional prompter system 1 shown in FIG. 5 comprises a prompter body 4 and a television camera 5, which are mounted on a panhead 3 of a pedestal 2. In the prompter system 1, the prompter body 4 is detachably attached to the panhead 3, and a camera mount 6, on which the television camera 5 is mounted, is unitedly connected to the prompter body 4. The prompter body 4 is provided with a liquid crystal panel 7 for displaying materials such as a broadcasting script, and a semitransparent mirror 9 for reflecting the script image displayed on the liquid crystal panel 7 in the direction to which a taking lens 8 of the television camera 5 points.

When the television camera 5 that has been used with the prompter system 1 is used for shooting a television program that requires no prompter, the prompter body 4 with the camera mount 6 is detached from the panhead 3 along with the television camera 5, and the television camera 5 is detached from the camera mount 6, then the television camera 5 is attached again to the panhead 3.

Since the conventional prompter system 1 is constructed in such a manner as to have the prompter body 4 and the camera mount 6 in the same body, the television camera 5 must be detached together with the prompter body 4 when detaching the prompter body 4 from the panhead 3; hence, detachment of the prompter body 4 has been problematic.

SUMMARY OF THE INVENTION

The present invention has been developed in view of the above-described circumstances, and has as its object the provision of a prompter system which enables easy detachment of a prompter body from a panhead.

In order to achieve the above-described object, the present invention is directed to a prompter system, comprising: a mount plate which is attached on a panhead, a television camera being detachably mounted on the mount plate; and a prompter body which displays a script image for a person to whom the television camera is trained, the prompter body being detachably mounted on the mount plate in front of the television camera.

According to the present invention, the television camera is attached to the mount plate which is attached to the panhead, and the prompter body is detachably attached to the mount plate. When detaching the prompter body from the panhead, the prompter body is detached by itself only from the mount plate without detaching the television camera from the mount plate. Therefore, the prompter body can be easily detached from the panhead.

Preferably, the prompter body is connected to the mount plate through a vertical position adjustment member, which adjusts a vertical position of the prompter body with respect to a taking lens of the television camera. Hence, an optical axis adjustment between the prompter body and the television camera can be easily performed.

Preferably, the television camera is slidably attached to the mount plate. Hence, the resultant center of gravity of the components mounted on the panhead can be adjusted to be always positioned right above the panhead, so that the television camera can be easily operated, whether the prompter body is used or not.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 1 is an entire view of a prompter system according to an embodiment of the present invention;

DETAILED DESCRIPTION OF THE PREFERRED EMBODIMENTS

Figure 2:
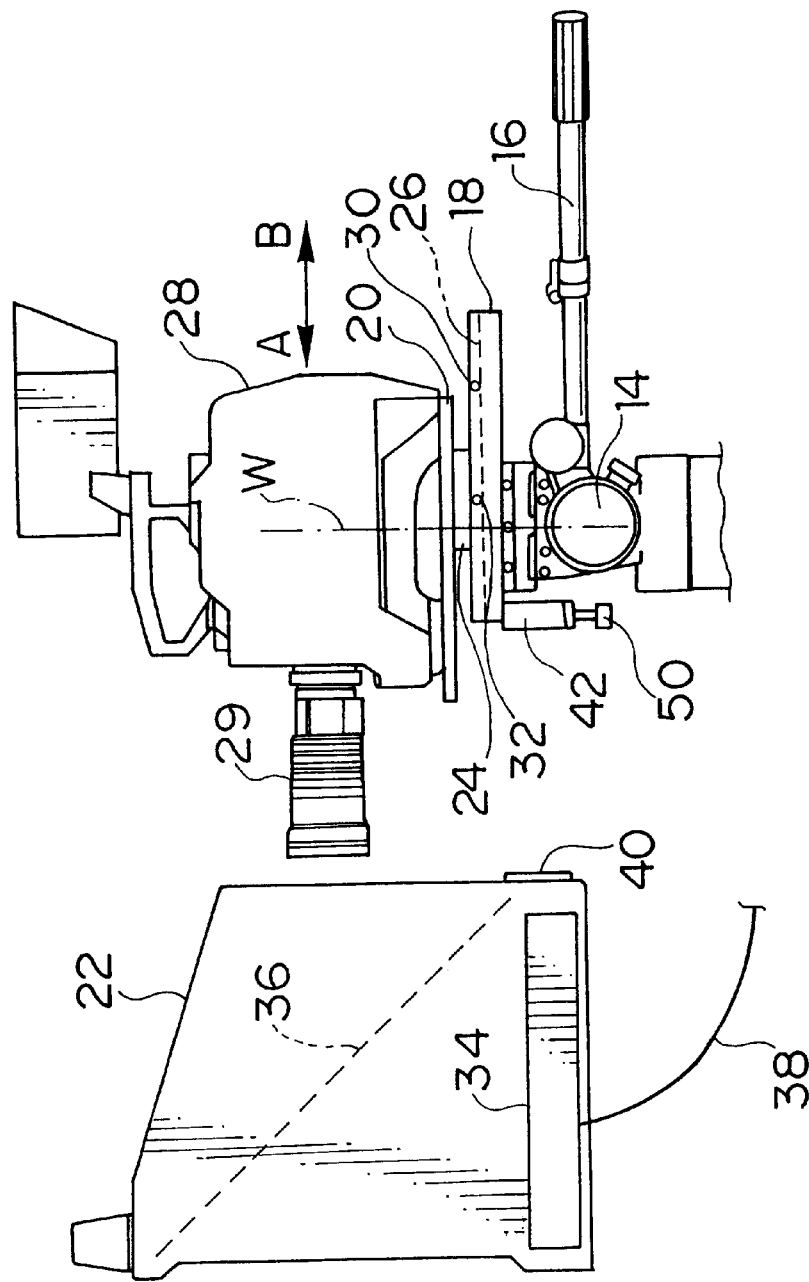
FIG. 2 is a view showing a state where a prompter body is detached from a mount plate in the prompter system in FIG. 1.

Hereunder a preferred embodiment will be described in detail of the prompter system of the present invention in accordance with the accompanied drawings.

A prompter system 10 in FIG. 1 is mounted on a panhead 14 of a movable pedestal 12, and is directed to a desired direction by panning and/or tilting operation with a pan rod 16 provided to the panhead 14.

The prompter system 10 comprises a mount plate 18, a camera mount 20 and a prompter body 22. The mount plate 18 is detachably fastened to a bolt (not shown) protruding from the top of the panhead 14.

A dovetail groove 26 (see FIG. 2) is formed in the top face of the mount plate 18, and a dovetail tenon 24 is formed on the bottom face of the camera mount 20. The dovetail groove 26 slidably receives the dovetail tenon 24, and the camera mount 20 is thereby mounted on the mount plate 18 to be capable of horizontally moving back and forth in directions of A and B in FIG. 2 with respect to the prompter body 22.

According to the above-described structure, a television camera 28 mounted on the camera mount 20 can slide in a range between a first position in FIG. 1 at which the television camera 28 is used with the prompter body 22 and a second position in FIG. 2 at which the television camera 28 is used without the prompter body 22. When the prompter body 22 is used, the television camera 28 is positioned at the first position as shown in FIG. 1 so that the resultant center of gravity of all the components, which include the prompter body 22 and the television camera 28, mounted on the panhead 14 is positioned right above the panhead 14. On the other hand, when the prompter body 22 is not used, the television camera 28 is positioned at the second position as shown in FIG. 2 forwardly with respect to the first position in FIG. 1 so that the resultant center of gravity of all the components, which exclude the prompter body 22, mounted on the panhead 14 is positioned on the line W right above the panhead 14.

A pair of bolts 30 and 32 are inserted from the side of the mount plate 18 to the dovetail groove 26 in purpose of fixing the dovetail tenon 24 with respect to the mount plate 18 at each of the first and second positions in FIGS. 1 and 2. When the bolt 30 is fastened at the time the camera mount 20 is at the first position in FIG. 1, the dovetail tenon 24 of the camera mount 20 is pressed and held with the tip of the bolt 30 and the dovetail groove 26, whereby the camera mount 20 can be fixed at the first position. Similarly, when the bolt 32 is fastened at the time the camera mount 20 is at the second position in FIG. 2, the camera mount 20 is fixed to the second position.

The prompter body 22 is formed like a box having an opening at the left-hand side in FIG. 1, and a liquid crystal display panel 34 as a display device is arranged at the bottom of the prompter body 22. A semitransparent mirror 36 is arranged above the liquid crystal display panel 34, and the semitransparent mirror 36 is inclined at 45 degrees with respect to a display face of the liquid crystal display panel 34.

The liquid crystal display panel 34 displays images of letters and so forth, and control signals are applied from a liquid crystal panel control circuit (not shown) to individual liquid crystal cells constituting the liquid crystal display panel 34. The liquid crystal panel control circuit generates the control signals in accordance with a video signal inputted from an image generator (not shown) via a cable 38 so as to display images of letters of a news script (a material) for example on the liquid crystal display panel 34. The displayed image is reflected by the semitransparent mirror 36 toward a newscaster (not shown). In the present embodiment, the liquid crystal display panel 34 is applied as the display device; however, another display device such as a CRT may be used instead of the liquid crystal display panel 34.

A male coupling piece 40 is provided at the back end of the prompter body 22 (i.e., at the right-hand bottom corner of the prompter body 22 in FIG. 2), and a female coupling piece 42 is provided at the front end of the mount plate 18 (i.e., at the left-hand end of the mount plate 18 in FIG. 2). The prompter body 22 is detachably attached to the mount plate 18 by coupling the male coupling piece 40 with the female coupling piece 42.

Figure 3:
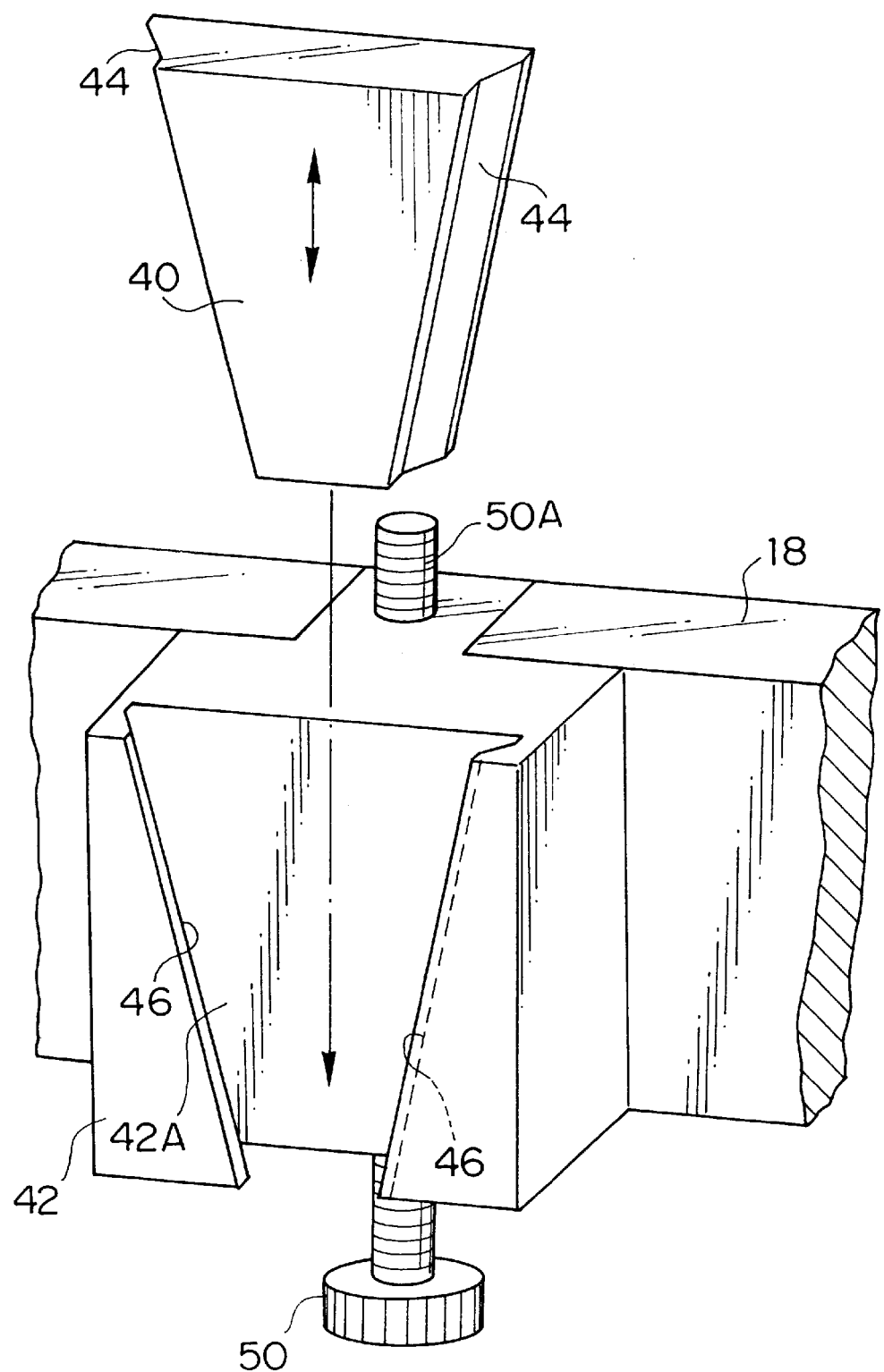
FIG. 3 is a perspective view of a connecting member between the prompter body and the mount plate.

As seen from FIG. 3, the male coupling piece 40 is formed like a trapezoidal plate, and tapered coupling parts 44 which become narrower toward the bottom are formed at both sides of the male coupling piece 40.

Tapered grooves 46 are formed on a face 42A of the female coupling piece 42 which is opposite to the male coupling piece 40, and the tapered grooves 46 are narrowed toward the bottom. The tapered coupling parts 44 of the male coupling piece 40 are inserted to the tapered grooves 46, whereby they are coupled with each other. Thus, the prompter body 22 is detachably attached to the mount plate 18 through the male coupling piece 40 and the female coupling piece 42.

Figure 4:
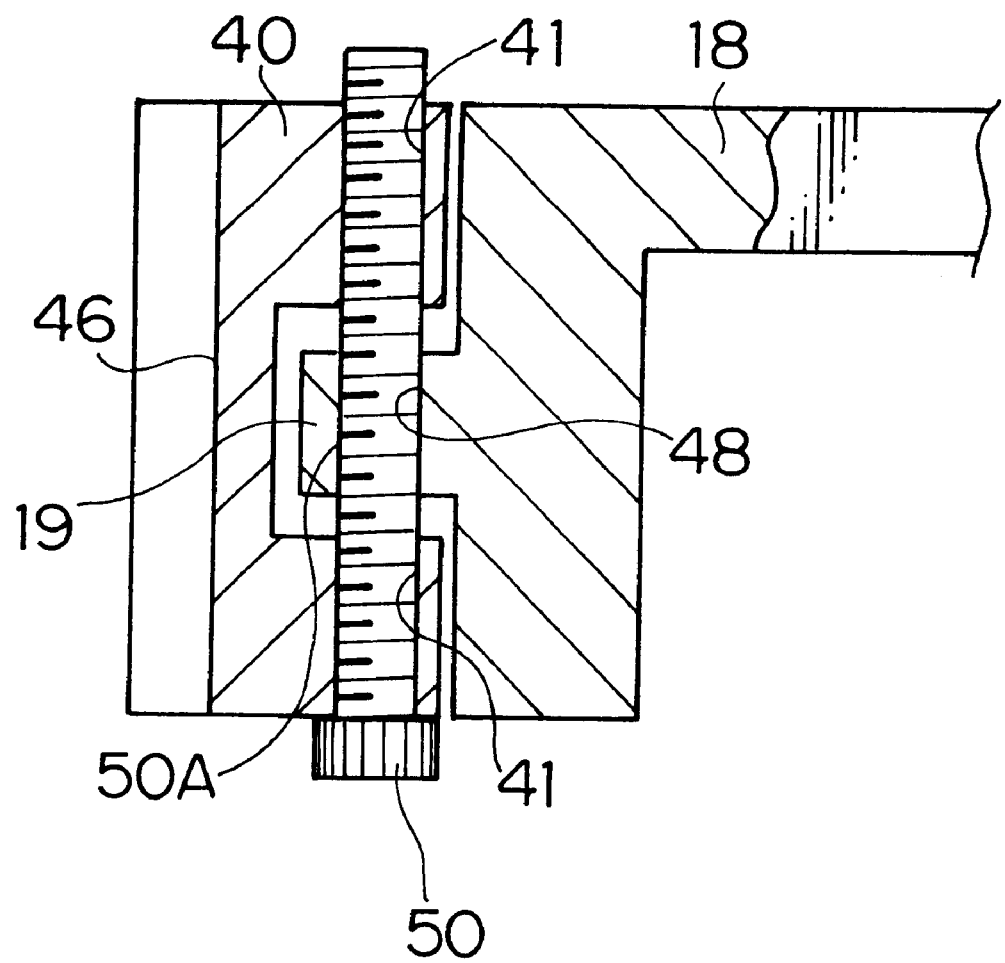
FIG. 4 is a side view showing an essential part of the connecting member in FIG. 3.
Figure 5:
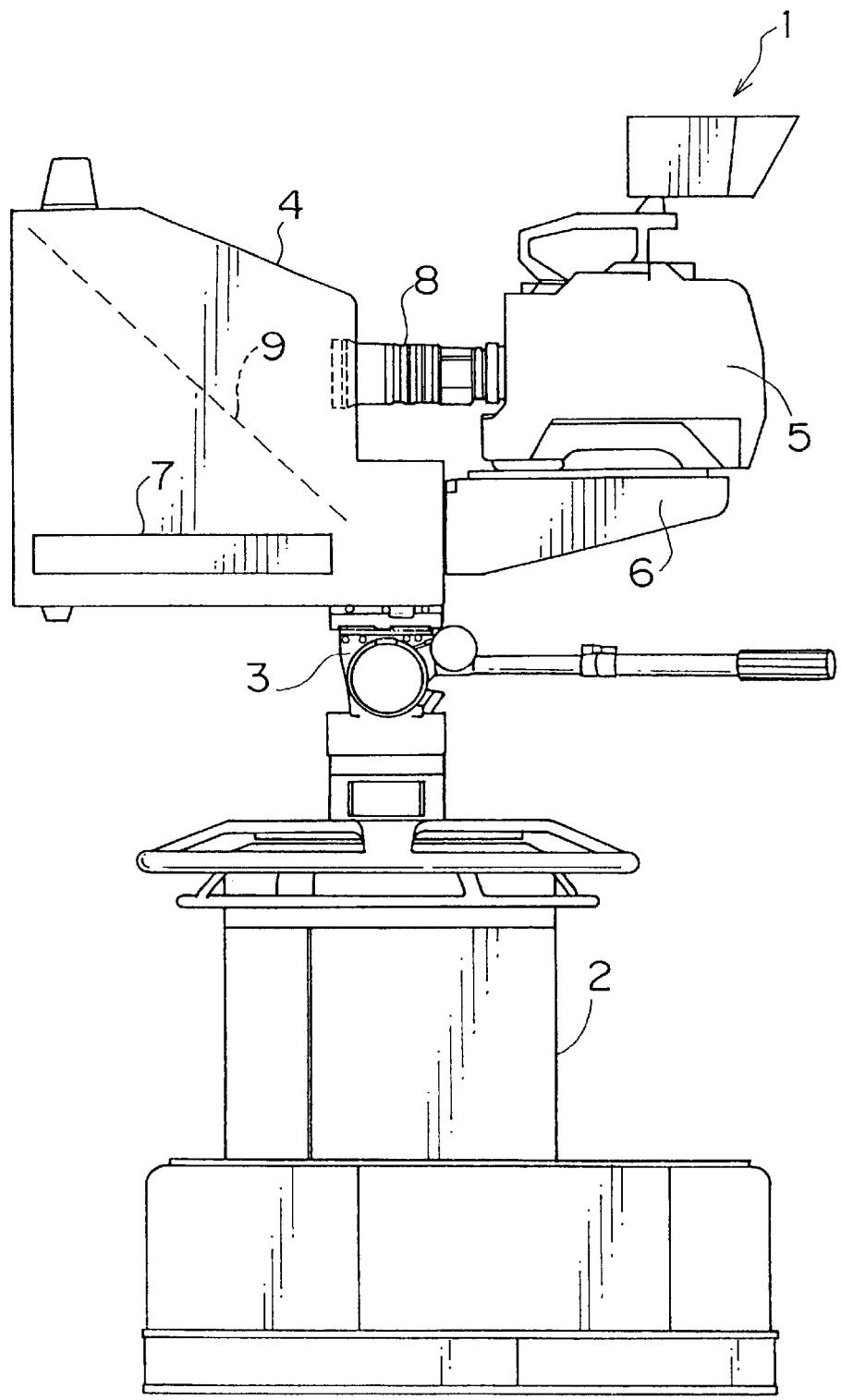
FIG. 5 is an entire view of a conventional prompter system.

As seen from FIG. 4, a projecting portion 19 is formed at a front end face of the mount plate 18. A threaded hole 48 is formed so as to go through vertically from the top to bottom of the projecting member 19, and holes 41 are formed in the male coupling piece 40. A bolt 50 is inserted from the bottom of the male coupling piece 40 through the hole 41, the threaded hole 48 and the hole 41. When the bolt 50 is rotated in that state, the male coupling piece 40 is moved vertically with respect to the mount plate 18 by a screw feed operation of the bolt 50 and the threaded hole 48. Thus, a fine position adjustment of the prompter body 22 with respect to the television camera 28 can be achieved, since the prompter body 22 can be moved vertically with respect to the mount plate 18.

In the prompter system 10 which is constructed as described above, when detaching the prompter body 22 from the panhead 14, the prompter body 22 itself can be detached from the mount plate 18 without detaching the television camera 28 from the mount plate 18, since the prompter body 22 is detachably attached to the mount plate 18 which is attached to the panhead 14. In the prompter system 10, therefore, the prompter body 22 can be easily detached from the panhead 14.

Moreover, according to the prompter system 10 in the present embodiment, the prompter body 22 is connected to the mount plate 18 through the vertical position adjustment device constituted of the holes 41, the threaded hole 48 and the bolt 50, so that the vertical position of the prompter body 22 can be adjusted with respect to the television camera 28 with the vertical position adjustment device. Hence, an optical axis adjustment between the prompter body 22 and the television camera 28 can be easily performed, since the prompter system 10 can adjust the position of the semitransparent mirror 36 of the prompter body 22 with respect to the taking lens 29 of the television camera 28.

Further, in the prompter system 10 of the present embodiment, the television camera 28 is slidably attached to the mount plate 18 through the sliding structure which is constructed of the dovetail tenon 24 and the dovetail groove 26. According to the structure, when the prompter body 22 is detached from the mount plate 18, the television camera 28 can be slid with respect to the mount plate 18 so that the resultant center of gravity of all the components, which exclude the prompter body 22, mounted on the panhead 14 is positioned on the line W right above the panhead 14. Therefore, the television camera 28 can be easily operated when the prompter is not required.

In the present embodiment, the holes 41, the threaded hole 48 and the bolt 50 are mentioned as the vertical position adjustment members; however, any member may be applied as far as it can adjust the vertical position of the prompter body 22 with respect to the mount plate 18.

In the present embodiment, the sliding structure which is constructed of the dovetail tenon 24 and the dovetail groove 26 is exemplified; however, any structure is applicable which can slide the camera mount 20 with respect to the mount plate 18.

As described hereinabove, according to the prompter system of the present invention, the television camera is attached to the mount plate which is attached to the panhead, and the prompter body is detachably attached to the mount plate; hence the prompter body can be easily detached from the panhead without detaching the television camera from the panhead.

Further, since the prompter body is connected to the mount plate through the vertical position adjusting member, the position of the semitransparent mirror of the prompter body with respect to the taking lens of the television camera can be adjusted so as to fit the optical axis of the prompter body to the optical axis of the taking lens of the television camera.

Furthermore, since the television camera is slidably attached to the mount plate, the resultant center of gravity of the components mounted on the panhead can be adjusted to be positioned right above the panhead, so that the television camera can be easily operated, whether the prompter body is used or not.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A prompter system, comprising:

a mount plate which is attached on a panhead;

a television camera being detachably mounted on the mount plate;

a prompter body;

a display device which displays a script image for a person to whom the television camera is trained;

a half mirror which is arranged to be inclined with respect to the display device and is positioned on an optical axis of a lens;

a vertical position adjustment device through which the prompter body is connected to the mount plate; and a tapered coupling device which comprises a tapered coupling piece attached to the mount plate and another tapered coupling piece attached to the prompter body, the tapered coupling piece and the another tapered coupling piece both being of a shape with a width that becomes narrower towards the bottom thereof;

wherein the prompter body is detachably mounted on the mount plate in front of the television camera with the tapered coupling device;

the prompter body and the camera are independently attached to and detached from the panhead via the mount plate; and a vertical position of the prompter body with respect to a taking lens of the television camera is adjustable with the vertical position adjustment device, wherein the vertical position adjustment device adjusts the prompter body in the vertical position by rotating a bolt inserted into a hole of the tapered coupling device.

2. The prompter system as defined in claim 1, wherein:

the television camera is slidably mounted on the mount plate; and a position of a resultant center of gravity of components mounted on the panhead is adjustable with respect to the panhead.

3. The prompter system as defined in claim 1, further comprising:

a camera mount having a dovetail tenon formed on a bottom face, the mount plate includes a dovetail groove formed on a top face, wherein the dovetail groove of the mount plate slidably receives the dovetail tenon of the camera mount thereby mounting the camera mount on the mount plate, the camera being mounted to the mount plate via the camera mount.

4. The prompter system as defined in claim 3, wherein the camera mount is capable of horizontally moving back and forth with respect to the prompter body thus allowing the camera mounted on the camera mount to slide from a first position to a second position whereby the camera is used with the prompter body and the camera is used without the prompter body.

5. The prompter system as defined in claim 4, wherein the camera mount can be fixed at either the first or the second position.

* * * * *